US010689097B2

(12) United States Patent
Nfonguem et al.

(10) Patent No.: US 10,689,097 B2
(45) Date of Patent: Jun. 23, 2020

(54) ACTUATORS AND METHODS FOR AIRCRAFT FLIGHT CONTROL SURFACES

(71) Applicants: BOMBARDIER INC., Dorval (CA); UNIVERSITE DE SHERBROOKE, Sherbrooke (CA)

(72) Inventors: Gustave Nfonguem, Verdun (CA); Patrick Chouinard, Sherbrooke (CA); Jean-Sébastien Plante, Sherbrooke (CA); Marc Denninger, Sherbrooke (CA); Vlad Iliescu, Kirkland (CA)

(73) Assignees: BOMBARDIER INC., Dorval (CA); UNIVERSITE DE SHERBROOKE, Sherbrooke (CA)

( * ) Notice: Subject to any disclaimer, the term of this patent is extended or adjusted under 35 U.S.C. 154(b) by 656 days.

(21) Appl. No.: 15/311,200

(22) PCT Filed: May 13, 2015

(86) PCT No.: PCT/IB2015/053536
§ 371 (c)(1),
(2) Date: Nov. 15, 2016

(87) PCT Pub. No.: WO2015/173755
PCT Pub. Date: Nov. 19, 2015

(65) Prior Publication Data
US 2017/0088251 A1    Mar. 30, 2017

Related U.S. Application Data

(60) Provisional application No. 61/994,180, filed on May 16, 2014.

(51) Int. Cl.
*F16H 1/20* (2006.01)
*F16H 3/06* (2006.01)
(Continued)

(52) U.S. Cl.
CPC ............ *B64C 13/40* (2013.01); *F16H 25/20* (2013.01); *F16H 25/205* (2013.01);
(Continued)

(58) Field of Classification Search
CPC ........... F16H 2025/2071; F16H 25/205; B64C 13/24
See application file for complete search history.

(56) References Cited

U.S. PATENT DOCUMENTS 2,824,460 A * 2/1958 Davis ...................... F16H 25/24
74/424.71
4,179,944 A    12/1979 Conner
(Continued)

FOREIGN PATENT DOCUMENTS

CN        1980010 A    6/2007
CN      101809273 A    8/2010
(Continued)

OTHER PUBLICATIONS

PCT international Search Report and Written Opinion dated Jul. 20, 2015 re: International Application No. PCT/IB2015/053536.
(Continued)

*Primary Examiner* — Jake Cook
(74) *Attorney, Agent, or Firm* — Norton Rose Fulbright Canada LLP

(57) ABSTRACT

Actuators and methods useful in the operation aircraft flight control surfaces are disclosed. Some of the actuators and methods disclosed may be useful in the operation flight control surfaces when a fault condition such as a jam associated with an actuator is detected. An exemplary electromechanical actuator disclosed comprises: a motor; a first screw configured for translation movement relative to a structure of the aircraft when driven by the motor; a second screw mounted in series with the first screw; and a fuse element coupling the first screw and the second screw
(Continued)

together to permit translation movement of the second screw together with the first screw. The fuse element may permit at least partial disengagement of the second screw from the first screw to permit translation of the second screw relative to the first screw. The fuse element may also allow an active flutter damping of the flight control surface. The fuse element may comprise magneto-rheological fluid.

21 Claims, 11 Drawing Sheets

(51) Int. Cl.

| | | |
|---|---|---|
| *F16H 27/02* | (2006.01) | |
| *F16H 29/02* | (2006.01) | |
| *F16H 29/20* | (2006.01) | |
| *B64C 13/40* | (2006.01) | |
| *F16H 25/20* | (2006.01) | |
| *F16H 25/24* | (2006.01) | |

(52) U.S. Cl.
CPC ..... *F16H 25/2056* (2013.01); *F16H 25/2454* (2013.01); *F16H 2025/2071* (2013.01); *F16H 2025/2081* (2013.01)

(56) References Cited

U.S. PATENT DOCUMENTS

| | | |
|---|---|---|
| 4,858,491 A | 8/1989 | Shube |
| 7,190,096 B2 | 3/2007 | Blanding et al. |
| 7,410,132 B1 | 8/2008 | Flatt |
| 7,834,494 B2 | 11/2010 | Blanding et al. |
| 8,230,750 B2 | 7/2012 | Flatt et al. |
| 2003/0155201 A1* | 8/2003 | Bowen ................ F16D 27/115 192/35 |
| 2009/0289145 A1* | 11/2009 | Behar .................. F16H 25/205 244/99.4 |
| 2011/0226075 A1 | 9/2011 | Nguyen et al. |
| 2013/0175132 A1* | 7/2013 | Battlogg ................ F16D 37/02 192/21.5 |
| 2016/0280357 A1* | 9/2016 | Himmelmann ......... F16H 25/20 |

FOREIGN PATENT DOCUMENTS

| | | |
|---|---|---|
| CN | 102130536 A | 7/2011 |
| EP | 1902947 A2 | 3/2008 |
| WO | 2013076158 A1 | 5/2013 |

OTHER PUBLICATIONS

More Thomas Avraam, MR-fluid brake design and its application to a portable muscular rehabilitation device, Nov. 2009, Universite Libre de Bruxelles, pp. 1-146.
The State Intellectual Property Office of the People's Republic of China, Notification of First Office Action dated Jun. 22, 2018 re: Application No. 201580026367.3.
English translation of China patent document No. CN 1980010 dated Jun. 13, 2007, https://patents.google.com/patent/CN1980010A/en?oq=CN1980010A, accessed on Jul. 19, 2018.
English translation of China patent document No. CN 101809273 dated Aug. 18, 2010, https://patents.google.com/patent/CN101809273A/en?oq=cn101809273a, accessed on Jul. 19, 2018.
English translation of China patent document No. CN 102130536 dated Jul. 20, 2011, https://patents.google.com/patent/CN102130536A/en?oq=CN102130536a, accessed on Jul. 19, 2018.

\* cited by examiner

ACTUATORS AND METHODS FOR AIRCRAFT FLIGHT CONTROL SURFACES

CROSS-REFERENCE TO RELATED APPLICATION(S)

This application is a national phase application under 35 U.S.C. 371 of International Patent Application No. PCT/IB2015/053536 filed on May 13, 2015, which claims priority from U.S. Provisional Patent Application Ser. No. 61/994,180, filed on May 16, 2014, the entire content of which is incorporated herein by reference.

TECHNICAL FIELD

The disclosure relates generally to the operation of aircraft flight control surfaces, and more particularly to actuators and methods useful for fault-tolerant operation and damping of aircraft flight control surfaces.

BACKGROUND OF THE ART

Aircraft typically comprise movable flight control surfaces that are deployed, retracted and/or deflected during operation of such aircraft. Primary control surfaces of fixed-wing aircraft are typically actuated using hydraulic actuators due to their relatively high reliability. Although electromechanical actuators (EMAs) have some operational advantages over hydraulic actuators, EMAs are still not typically used to actuate primary flight controls surfaces of aircraft. One reason for this is that existing EMAs do not provide the same level of reliability as that associated with hydraulic actuators. For example, some existing EMAs may come with a potential risk of mechanical jam which may contribute to the lower level of reliability in comparison with hydraulic actuators.

Improvement is therefore desirable.

SUMMARY

In one aspect, the disclosure describes an electromechanical actuator for actuating a flight control surface of an aircraft. The actuator comprises:
  a motor;
  a first screw configured for translation movement relative to a structure of the aircraft when driven by the motor;
  a second screw mounted in series with the first screw, the first screw and the second screw defining a load path between the aircraft structure and the flight control surface;
  a fuse element coupling the first screw and the second screw together to permit translation movement of the second screw together with the first screw, the fuse element permitting at least partial disengagement of the second screw from the first screw to permit translation of the second screw relative to the first screw.

The second screw may be at least partially received inside the first screw. The first screw and the second screw may be configured to permit telescopic movement of the second screw relative to the first screw when the fuse element at least partially disengages the second screw from the first screw.

The fuse element may comprise magneto-rheological fluid. The fuse element may comprise a permanent magnet for directing a first magnetic flux through the magneto-rheological fluid. The fuse element may comprise a coil for receiving a current therethrough for producing a second magnetic flux that redirects at least part of the first magnetic flux away from the magneto-rheological fluid.

The fuse element may function as a power-off brake.

The first screw may be coupled to the motor via a first nut. The first nut may be rotatably supported by the aircraft structure.

The second screw may be coupled to the first screw via a second nut. The second nut may be rotatably supported by the first screw.

The first screw may be coupled to the motor via a gear.

The first screw may be mounted to substantially prevent rotation of the first screw relative to the aircraft structure.

The second screw may be mounted to substantially prevent rotation of the second screw relative to the first screw.

In another aspect, the disclosure describes an assembly for actuating a flight control surface of an aircraft. The assembly comprises:
  a first screw configured for translation movement relative to a structure of the aircraft;
  a second screw mounted in series with the first screw, the first screw and the second screw being configured to define a load path between the aircraft structure and the flight control surface;
  a fuse element coupling the first screw and the second screw together to permit translation movement of the second screw together with the first screw, the fuse element permitting at least partial disengagement of the second screw from the first screw to permit translation of the second screw relative to the first screw.

The second screw may be at least partially received inside the first screw. The first screw and the second screw may be configured to permit telescopic movement of the second screw relative to the first screw when the fuse element at least partially disengages the second screw from the first screw.

The fuse element may comprise magneto-rheological fluid. The fuse element may comprise a permanent magnet for directing a first magnetic flux through the magneto-rheological fluid. The fuse element may comprise a coil for receiving a current therethrough for producing a second magnetic flux that redirects at least part of the first magnetic flux away from the magneto-rheological fluid.

The fuse element may function as a power-off brake.

The first screw may be coupled to the motor via a first nut. The first nut may be rotatably supported by the aircraft structure.

The second screw may be coupled to the first screw via a second nut. The second nut may be rotatably supported by the first screw.

The first screw may be coupled to the motor via a gear.

The first screw may be mounted to substantially prevent rotation of the first screw relative to the aircraft structure.

The second screw may be mounted to substantially prevent rotation of the second screw relative to the first screw.

In various embodiments, the present disclosure describes aircraft comprising one or more of the actuators, assemblies and components disclosed herein. Such aircraft may include fixed-wing aircraft.

In another aspect, the disclosure describes another assembly for actuating a flight control surface of an aircraft. The assembly comprises:
  an actuation member configured to be in a load path between the flight control surface and a structure of the aircraft for actuating the flight control surface relative to the aircraft structure; and a fuse element configured to be in the load path with the actuation member, the fuse element comprising magneto-rheological fluid.

The actuation member may comprise one or more screws.

The actuation member may comprise one or more gear mechanisms.

An electric motor may drive the actuation member.

The fuse element may comprise a permanent magnet for directing a first magnetic flux through the magneto-rheological fluid. The fuse element may comprise a coil for receiving a current therethrough for producing a second magnetic flux that redirects at least part of the first magnetic flux away from the magneto-rheological fluid.

The fuse element may function as a power-off brake.

In another aspect, the disclosure describes a flight control assembly for a fixed-wing aircraft. The assembly comprises:
 a primary flight control surface mounted for actuation relative to a structure of the aircraft;
 an electromechanical actuator defining at least part of a first load path between the aircraft structure and the flight control surface, the electromechanical actuator comprising:
  a motor;
  a first screw mounted for translation movement relative to the structure of the aircraft when driven by the motor;
  a second screw mounted in series with the first screw; and
  a fuse element coupling the first screw and the second screw together to permit translation movement of the second screw together with the first screw, the fuse element permitting at least partial disengagement of the second screw from the first screw to permit translation of the second screw relative to the first screw.

The flight control assembly may comprise a second actuator defining at least part of a second load path between the aircraft structure and the flight control surface.

In another aspect, the disclosure describes a flight control assembly for a fixed-wing aircraft. The assembly comprises:
 a primary flight control surface mounted for actuation relative to a structure of the aircraft;
 an actuation member in a first load path between the flight control surface and the structure of the aircraft for actuating the flight control surface relative to the aircraft structure; and
 a fuse element in the first load path with the actuation member, the fuse element comprising magneto-rheological fluid.

The flight control assembly may comprise an actuator separate from the actuation member and defining at least part of a second load path between the aircraft structure and the flight control surface.

The actuation member may comprise one or more screws.

The actuation member may comprise one or more gear mechanisms.

In another aspect, the disclosure describes a method of operating a flight control surface of an aircraft using a first screw mounted in series with a second screw defining a load path between the flight control surface and a structure of the aircraft. The method comprises:
 translating the first screw and the second screw together relative to the aircraft structure to actuate the flight control surface; and
 conditioned upon a fault condition associated with the load path being detected, at least partially disengaging the second screw from the first screw to permit relative translation movement between the first screw and the second screw and at least partially remove the load path provided by the first screw and the second screw.

The fault condition may comprise an at least partial jam associated with a first actuator comprising the first screw and the second screw. A second actuator may be used for actuating the flight control surface.

Relative translation movement between the first screw and the second screw may comprise telescopic movement of the second screw relative to the first screw.

At least partially disengaging the second screw from the first screw may comprise reducing an amount of magnetic flux passing through magneto-rheological fluid.

At least partially disengaging the second screw from the first screw may comprise redirecting a magnetic flux passing through the magneto-rheological fluid away from the magneto-rheological fluid.

In another aspect, the disclosure describes another method for operating a flight control surface of an aircraft where a first actuator and a second actuator are coupled to the flight control surface, the first actuator comprising a fuse element with magneto-rheological fluid and a permanent magnet producing a first magnetic flux through the magneto-rheological fluid, the method comprising:
 detecting a fault condition associated with the first actuator;
 redirecting at least some of the first magnetic flux away from the magneto-rheological fluid of the fuse element to at least partially remove a first load path to the flight control surface provided by the first actuator; and
 actuating the flight control surface using the second actuator.

The fault condition may comprises an at least partial jam associated with the first actuator.

Redirecting at least some of the first magnetic flux away from the magneto-rheological fluid may comprise producing a second magnetic flux that influences the first magnetic flux.

In a further aspect, the disclosure describes a method for operating a flight control surface of an aircraft using an actuator comprising a fuse element with magneto-rheological fluid and a permanent magnet producing a first magnetic flux through the magneto-rheological fluid. The method comprises:
 actuating the flight control surface using the actuator; and
 controlling the yield shear strength of the magneto-rheological fluid to control the stiffness of the actuator and thereby control damping of the of the flight control surface.

Controlling the yield shear strength of the magneto-rheological fluid may comprise redirecting at least some of the first magnetic flux away from the magneto-rheological fluid of the fuse element. Redirecting at least some of the first magnetic flux away from the magneto-rheological fluid may comprise producing a second magnetic flux that influences the first magnetic flux.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

The present disclosure relates to the operation of flight control surfaces of aircraft. In various embodiments, the present disclosure describes systems, actuators, assemblies, components and methods useful in the operation of flight control surfaces of aircraft. The systems, actuators, assemblies, components and methods disclosed herein may, for example, be useful in maintaining at least partial control of a flight control surface during a jam or other fault condition(s) associated with an actuator of the flight control surface. In some embodiments, systems, actuators, assemblies, components and methods disclosed herein may be used in conjunction with primary flight control surfaces (e.g., ailerons, rudders, elevators and rotors) of fixed-wing or rotary wing aircraft. However, it is understood that aspects of the present disclosure may be used in conjunction with secondary or other types of flight control surfaces (e.g., spoilers, flaps, slats and airbrakes) and with other types of aircraft than those exemplified herein. Some aspects of the present disclosure may facilitate the use of electromechanical actuators for actuating aircraft flight control surfaces including primary flight control surfaces. For example, some aspects of the present disclosure may facilitate jam-tolerant operation and/or active flutter damping of aircraft flight control surfaces including primary flight control surfaces using electromechanical actuators.

Figure 1:
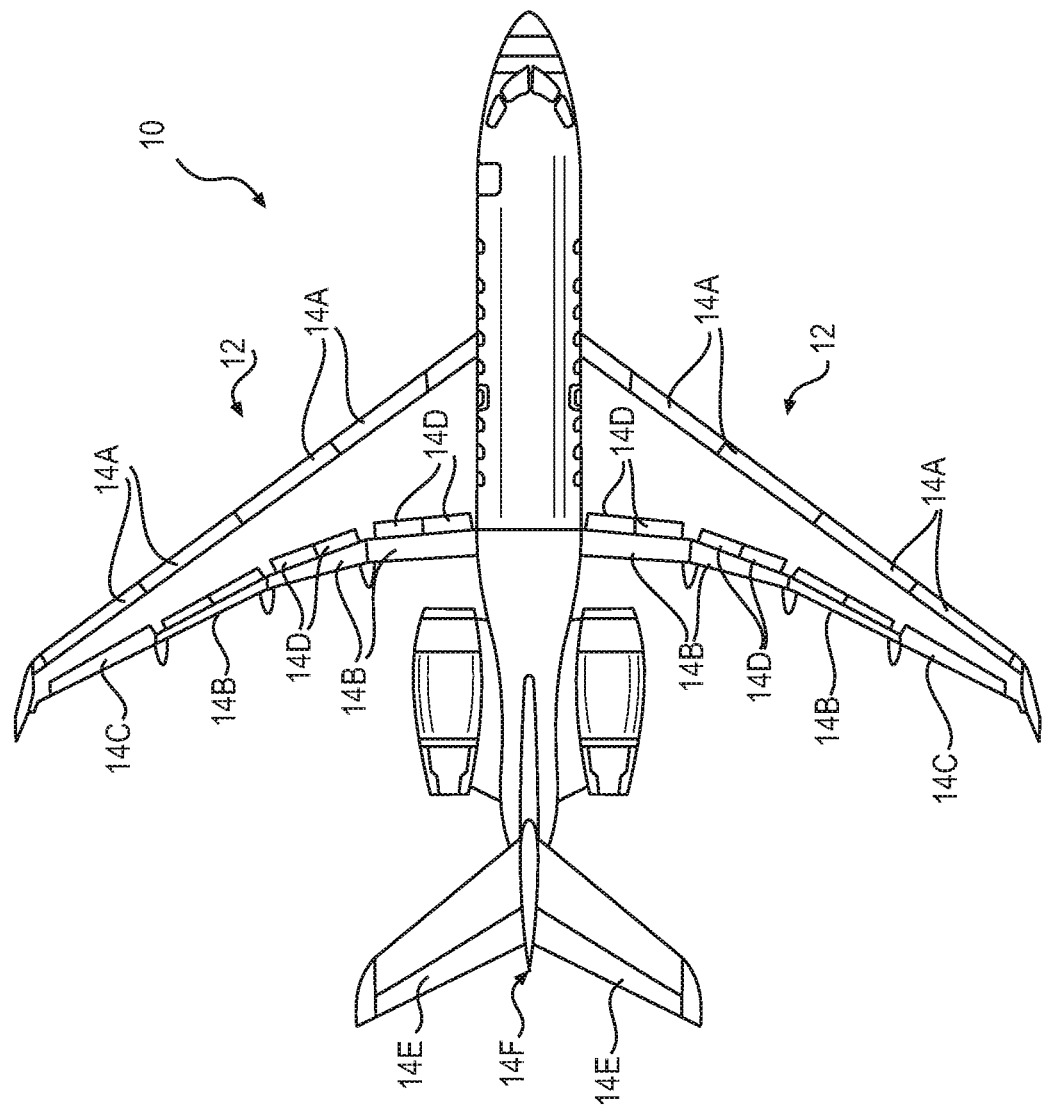
FIG. 1 is a top plan view of an exemplary aircraft.

FIG. 1 illustrates a top plan view of an exemplary aircraft 10, with which one or more of the actuators, assemblies, components and methods of the present disclosure may be incorporated. Aircraft 10 may, for example, include any suitable aircraft such as corporate, private, commercial or any other type of aircraft that may comprise one or more flight control surfaces. Aircraft 10 may be a fixed-wing aircraft but it is understood that aspects of the present disclosure could also apply to rotary-wing aircraft. Aircraft 10 may, for example, be a narrow-body, twin engine jet airliner. Accordingly, aircraft 10 may comprise wings 12 where each wing 12 may comprise one or more movable flight control surfaces 14 (e.g., 14A-14D). For example, each wing 12 may comprise one or more high-lift flight control surfaces including one or more leading edge slats 14A and/or one or more trailing edge flaps 14B. Each wing 12 may also comprise one or more ailerons 14C and one or more spoilers 14D. Aircraft 10 may also comprise one or more elevators 14E and one or more rudders 14F.

Figure 2:
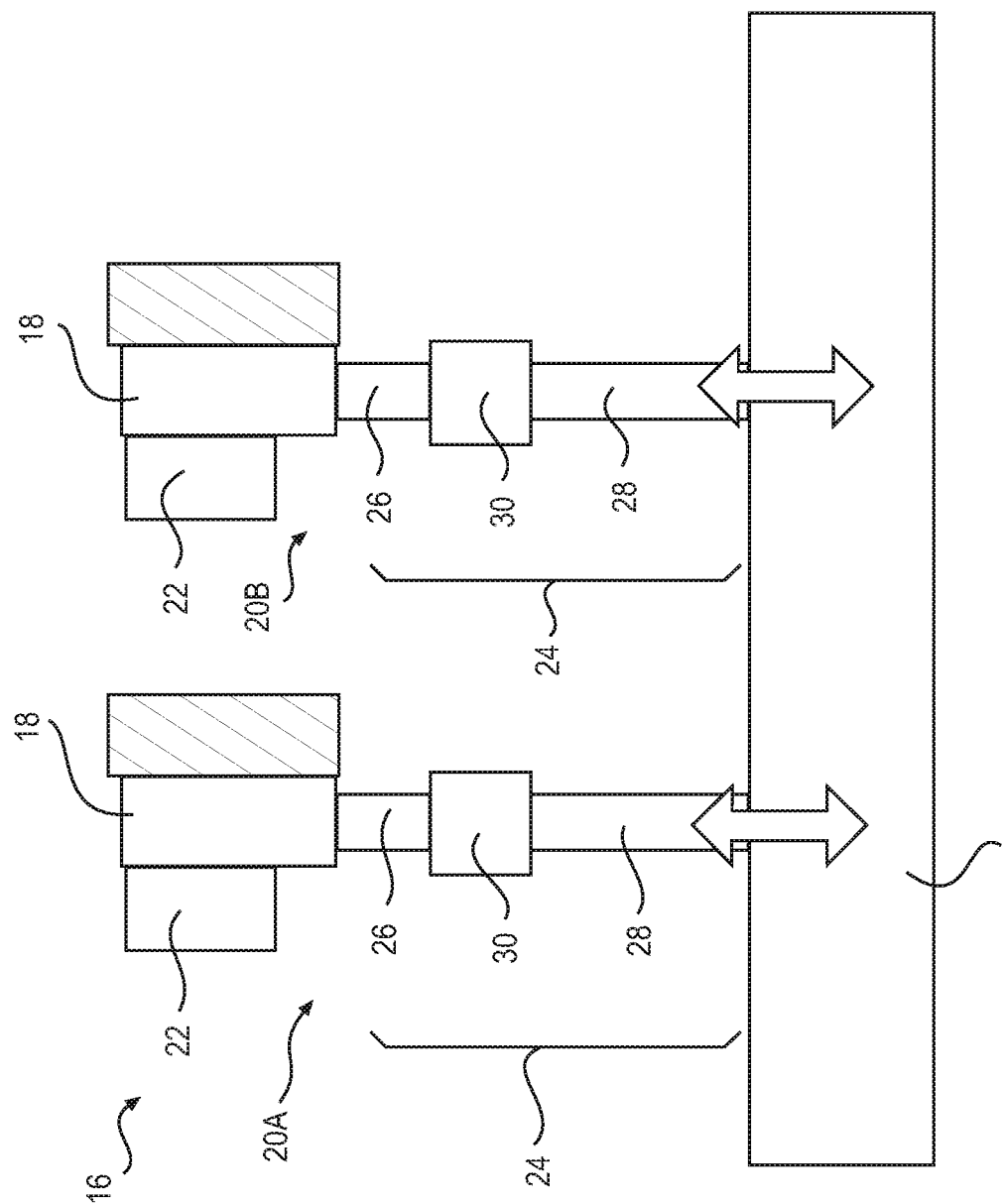
FIG. 2 is a schematic representation of an exemplary flight control assembly of the aircraft of FIG. 1.

FIG. 2 is a schematic representation of an exemplary flight control assembly 16, which may be part of aircraft 10 and which may comprise flight control surface 14 (e.g., 14A-14F) mounted for actuation relative to structure 18 of the aircraft 10. Flight control assembly 16 may comprise one or more actuators 20 (e.g., 20A and 20B) configured to actuate flight control surface 14 relative to aircraft structure 18. In some embodiments, the one or more actuators 20 may include first actuator 20A and second actuator 20B. First and second actuators 20A and 20B may be of the same or of different types and configurations. For example, one or each of first actuator 20A and second actuator 20B may be an electromechanical actuator (referred hereinafter as "EMA"). Alternatively, in some embodiments first actuator 20A and/or second actuator 20B may comprise one or more hydraulic or other types of actuators. First and second actuators 20A and 20B may each be sized and configured to provide at least some level of redundancy for each other so that in the occurrence of a fault condition associated with one of actuators 20A, 20B, the other of actuators 20A, 20B may provide at least some control of flight control surface 14. A fault condition may comprise a jam or some other condition where the performance of the affected actuator 20A or 20B may be degraded. The level of control and functionality provided by the healthy actuator 20A or 20B during such event may, in some cases, be reduced in comparison with that provided when both actuators 20A and 20B are healthy. In some embodiments, the healthy actuator 20A or 20B may, for example, be used to simply retract control surface 14 and keep control surface 14 retracted for the remainder of the flight of aircraft 10. The functionality of the healthy actuator 20A or 20B may depend on the flight control surface 14 to which actuators 20A and 20B are coupled. In some embodiments where flight control surface 14 comprises a primary control surface of aircraft 10, each of actuators 20A and 20B (or the remaining healthy actuators together) may have the ability to provide full functionality (i.e., provide full redundancy) for the associated flight control surface 14 in the event of fault associated with the other actuator 20A or 20B. In some embodiments, flight control assembly 16 may comprise more than two actuators 20A, 20B for actuating flight control surface 14.

In FIG. 2, both actuators 20A and 20B are shown as having identical constructions so only one of actuators 20A and 20B (referred hereinafter as "actuator 20") will be further described below. Actuator 20 may comprise motor 22 and actuating assembly 24. Motor 22 may comprise an electric, hydraulic or other type of motor. In various embodiments, actuator 20 may be considered an EMA that may be used in aircraft 10 instead of or in addition to one or more hydraulic actuators. In some embodiments, electrical systems of aircraft 10 comprising actuator 20 may offer a relatively high level of efficiency and may offer more flexibility in terms of power control and management compared to some conventional hydraulic or pneumatic actuation mechanisms.

Actuating assembly 24 may be driven by motor 22 to cause actuation of flight control surface 14, Actuating assembly 24 may define a load path between flight control surface 14 and aircraft structure 18. Actuating assembly 24 may comprise first screw 26 mounted for translation movement relative to aircraft structure 18 when driven by motor 22. First screw 26 may function as an actuation member in the load path between flight control surface 14 and aircraft structure 18. Actuating assembly 24 may also comprise second screw 28 mounted in series with the first screw 26 in the load path. First screw 26 and second screw 28 together may at least partially define the load path between aircraft structure 18 and flight control surface 14.

Actuating assembly 24 may also comprise fuse element 30 coupling first screw 26 and second screw 28 together to permit translation movement of second screw 26 together with first screw 28. As explained further below, fuse element 30 may permit at least partial disengagement of second screw 28 from first screw 26 to permit relative translation between second screw 28 and first screw 26. The disengagement of second screw 28 from first screw 26 via fuse element 30 may cause at least partial removal of the load path provided by actuator 20 between flight control surface 14 and aircraft structure 18. First screw 26 and/or second screw 28 may be part of ball screw or roller screw arrangements.

Figure 3:
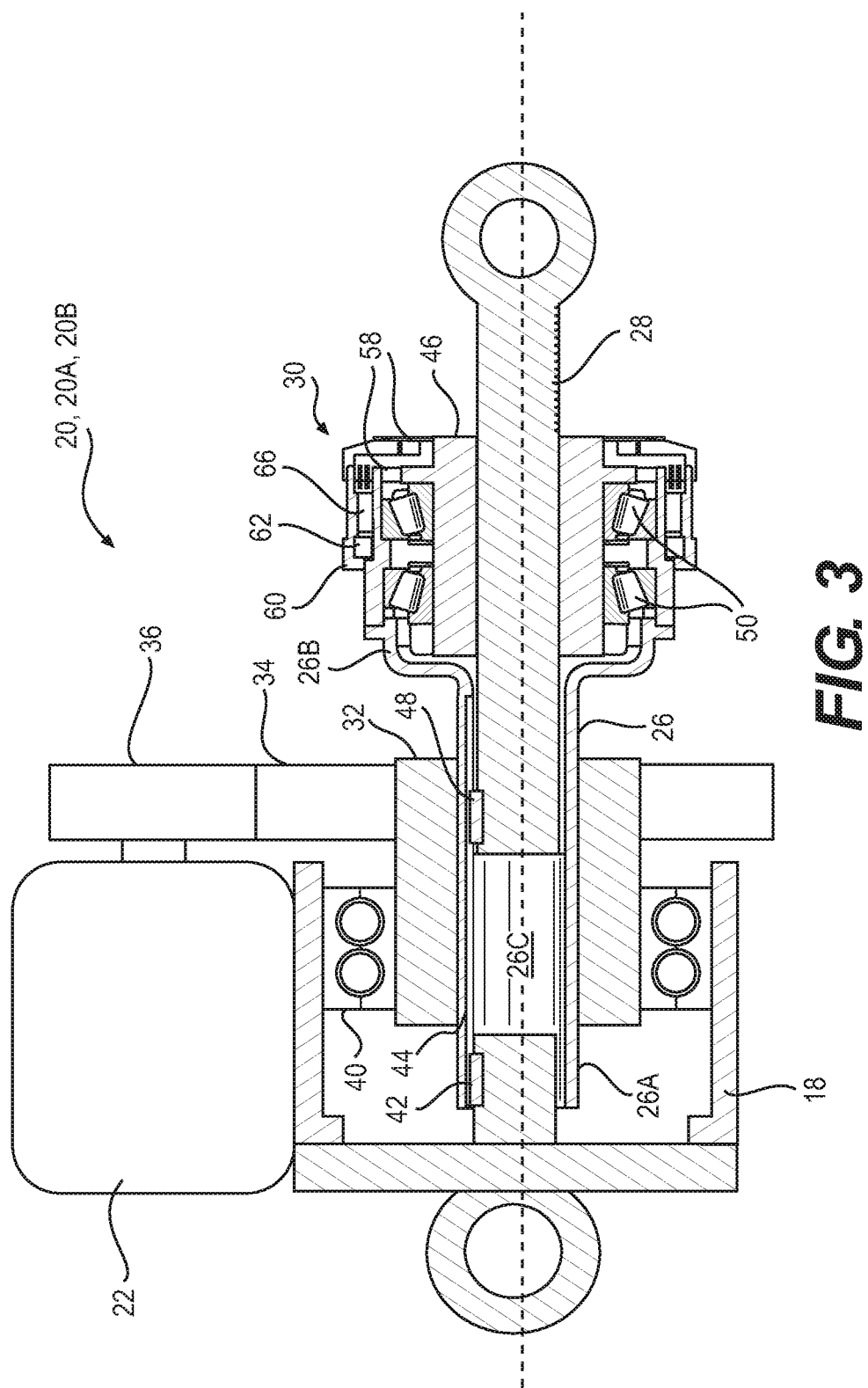
FIG. 3 is a schematic representation of an exemplary actuator of the flight control assembly of FIG. 2 showing a longitudinal cross section of an actuation assembly of the actuator.

FIG. 3 is an exemplary schematic representation of actuator 20 of flight control assembly 16 showing a longitudinal cross section of actuation assembly 24 of actuator 20. First screw 26 may comprise two portions 26A and 26B having different outside diameters. For example, first portion 26A may have a smaller outside diameter than second portion 26B. First screw 26 may also have a hollow portion 26C in which at least part of second screw 28 may be received. The outside of first portion 26A of first screw 26 may be threaded and coupled to an output shaft of motor 22 via first nut 32 and gears 34 and 36. Even though second portion 26B is described herein as being part of first screw 26, it should be understood in light of the present disclosure that second portion 26B may not be threaded and may not itself be considered a screw. In various embodiments, second portion 26B may be integrally formed as one piece with first portion 26A or alternatively may be a separate component that is welded or otherwise secured to first portion 26A so that first portion 26A and second portion 26B may rotate together.

Other power transfer mechanism(s) (e.g., gear box) may be suitable instead of or in addition to gears 34 and 36. First nut 32 may be rotatably supported by aircraft structure 18 via one or more bearings 40. Nut 32 may comprise a ball nut or a roller nut depending on the specific arrangement of first screw 26 and first nut 32. Bearing(s) 40 may be configured to withstand some thrust loads. First screw 26 may be engaged with structure 18 via key 42 and keyway 44 formed inside of first screw 26. Key 42 may slide in keyway 44 during translation of first screw 26. The engagement of first screw 26 with structure 18 may substantially prevent rotation of first screw 26 relative to structure 18 while permitting some translation movement of first screw 26 relative to structure 18. Accordingly, the rotation of first nut 32 driven by motor 22 via gears 34 and 36 may cause translation of first screw 26 relative to structure 18. The amount of translation movement (i.e., travel) of first screw 26 required relative to structure 18 may depend on the specific application so the actual relative sizes of the components of actuating assembly 24 may vary from those illustrated in FIG. 3.

Second screw 28 may be coupled to first screw 26 via second nut 46 and also via sliding key 48 and keyway 44. Second screw 28 may comprise external threads for engagement with second nut 46. Second nut 46 may comprise a ball nut or a roller nut depending on the specific arrangement of second screw 28 and second nut 46. The engagement of second screw 28 to first screw 26 via key 48 may substantially prevent rotation of second screw 28 relative to first screw 26 while permitting some translation movement of second screw 28 relative to first screw 26. Second nut 46 may be rotatably supported by second portion 26B of first screw 26 via one or more bearings 50. Bearing(s) 50 may comprise roller bearings and may be configured to withstand some thrust loads.

Fuse element 30 may be configured to establish engagement and disengagement between first screw 26 and second screw 28. In some embodiments, fuse element 30 may be configured to establish engagement between second portion 26B and second nut 46 so as to substantially prevent relative rotation between first screw 26 and nut 46. Accordingly, when fuse element 30 establishes engagement both second screw 28 and second nut 46 may be substantially prevented from rotating relative to first screw 26 so that second screw 28 may be translated together with first screw 26 when first screw 26 is translated while first nut 32 is driven by motor 22 via gears 34 and 36.

Fuse element 30 may also be configured to cause at least partial disengagement of second screw 28 from first screw 26 to permit relative translation between second screw 28 and first screw 26. As explained below, fuse element 30 may function as a power-off brake where engagement is established when no power is provided to fuse element 30 and disengagement is established when power is supplied to fuse element 30. The disengagement of second screw 28 from first screw 26 via fuse element 30 may comprise at least partial disengagement of second nut 46 from second portion 26B of first screw 26 so as to permit rotation of second nut 46 relative to first screw 26. During such disengagement, the air load on flight control surface 14 may urge second screw 28 toward first screw 26 and the rotation of second nut 46 relative to first screw 26 may cause second screw 28 to be back driven and hence cause translation of second screw 28 relative to first screw 26. During such translation, second screw 28 may be received inside of hollow portion 26C of first screw 26. Accordingly, in some embodiments, first screw 26 and second screw 28 may be configured to permit telescopic movement (e.g., retraction) of second screw 28 relative to first screw 26 when fuse element 30 at least partially disengages second screw 28 from first screw 26. When fuse element 30 established disengagement, translation movement of second screw 28 relative to first screw 26 may be guided via key 48 and keyway 44.

Figure 4A:
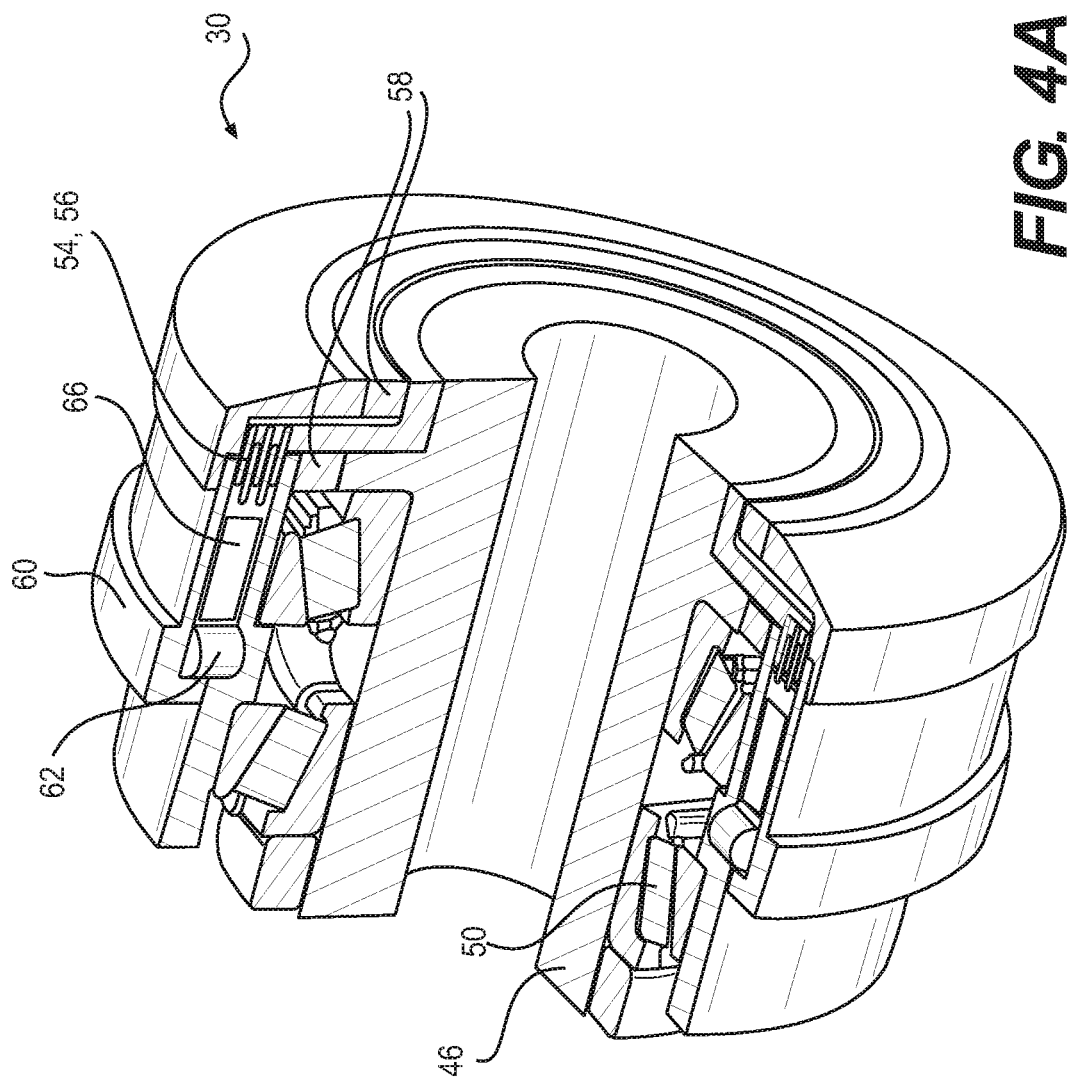
FIG. 4A is a perspective view showing an exemplary fuse element of the actuator of FIG. 3 with a portion of the fuse element cut away for the purpose of illustration.

FIG. 4A is a perspective view showing fuse element 30 of actuator 20 with a portion of fuse element 30 cut away to illustrate internal components of fuse element 30.

Figure 4B:
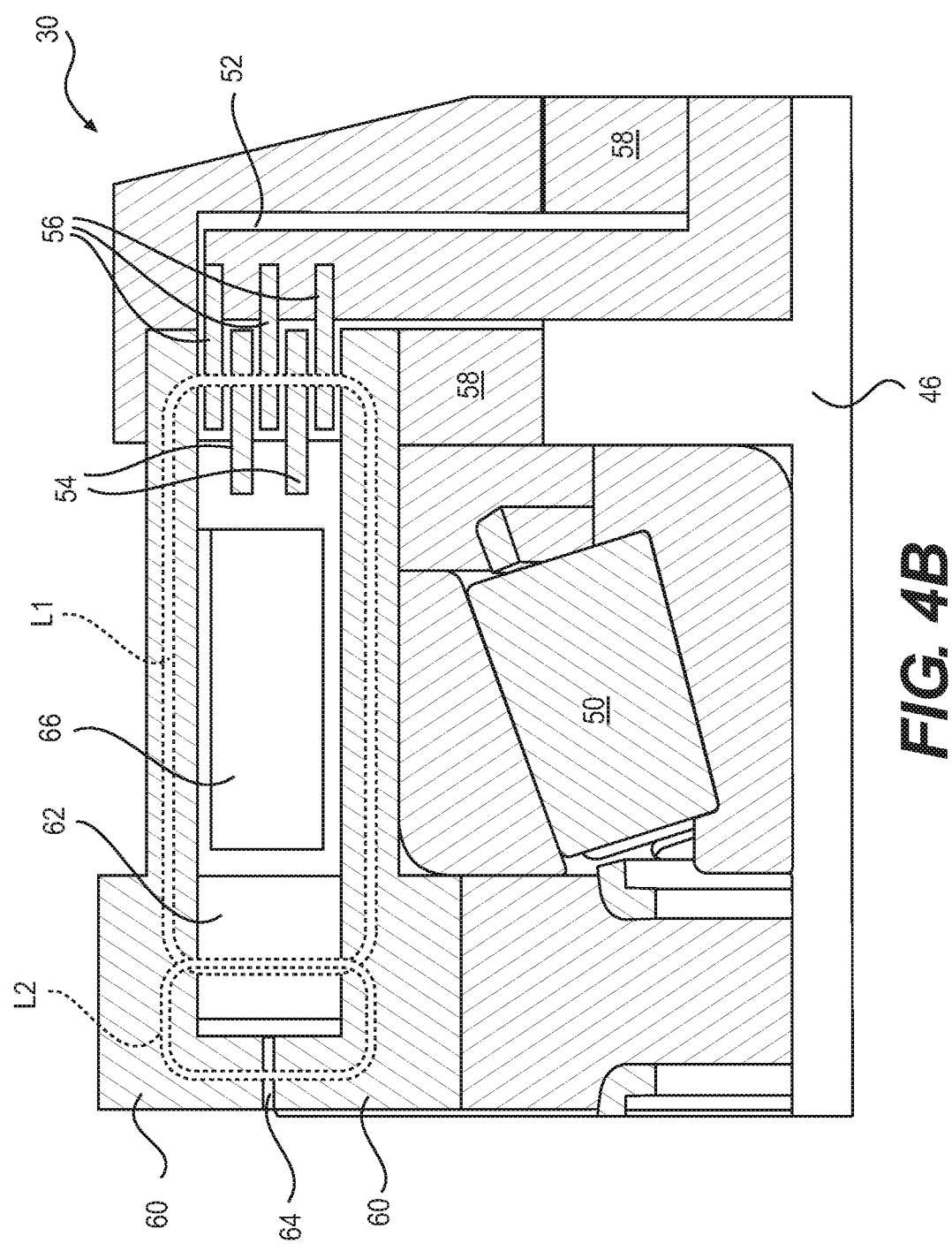
FIG. 4B shows an enlarged portion of the fuse element of the actuator of FIG. 3.

FIG. 4B shows an enlarged portion of actuator 20 shown in FIG. 3 showing fuse element 30 of actuator 20. Fuse element 30 may be part of the load path formed by first screw 26 and second screw 28 when fuse element 30 establishes engagement. Fuse element 30 may comprise any suitable coupling device that may be used to establish coupling (i.e., power transfer) between first screw 26 and second screw 28 and also disengagement of second screw 28 from first screw 26 when desired (i.e., reduce or eliminate power transfer between first screw 26 and second screw 28). In various embodiments, fuse element 30 may comprise a power-off brake where engagement is established when no power is provided to fuse element 30 and disengagement is established when power is supplied to fuse element 30.

In some embodiments, fuse element 30 may comprise magneto-rheological (MR) fluid 52 that may be used to establish power transfer between first screw 26 and second screw 28 when MR fluid 52 is subjected to a magnetic field. MR fluid 52 may, for example, comprise a base oil containing ferromagnetic particles. MR fluid 52 may comprise a viscoplastic fluid having a yield shear strength that is affected by a magnetic flux. MR fluid 52 may include any suitable MR fluid including hydrocarbon-based MR fluids such as, for example, product number MRF-140CG sold under the trade name LORD and Basonetic® 5030 sold under the trade name BASF.

Fuse element 30 may comprise a first set of one or more power transfer members 54 that may be secured to first screw 26 and a second set of power transfer members 56 that may be secured to second nut 46. First and second power transfer members 54, 56 may be interleaved and spaced apart from each other. The spaces between adjacent first and second power transfer members 54, 56 may be at least partially filled with MR fluid 52. Accordingly, power transfer members 54 and 56 may function as clutch plates which may be engaged and disengaged by controlling the yield shear strength of MR fluid 52. The yield shear strength of MR fluid 52 may be magnetically controlled. Fuse element 30 may also comprise one or more seals 58 for substantially retaining MR fluid 52.

Fuse element 30 may comprise one or more flux conducting members 60 that may serve to direct magnetic flux (referenced hereinafter as "permanent magnetic flux") from permanent magnet 62 to MR fluid 52 disposed between power transfer members 54, 56. An exemplary magnetic field extending between permanent magnet 62 and MR fluid 52 is illustrated by loop "L1" shown in FIG. 4B. Flux conducting members 60 may also serve to direct permanent magnetic flux away from MR fluid 52 disposed between power transfer members 54, 56. Accordingly, flux conducting members 60 may also define loop "L2" comprising gap 64 shown in FIG. 4B. In some embodiments, gap 64 may comprise an air gap. Alternatively, gap 64 may comprise a material having a magnetic susceptibility of about zero (0). When fuse element 30 is engaged and provides power transfer between power transfer members 54 and 56, a substantial portion of the permanent magnetic flux may be directed in flux conducting members 60 along loop L1 due to the resistance to magnetic flux provided by gap 64.

Fuse element 30 may also comprise coil 66 that may be used to redirect at least some of the permanent magnetic flux from loop L1 to loop L2 to thereby reduce the yield shear strength of MR fluid 52 and reduce the ability to transfer power via power transfer members 54 and 56. The redirection of at least some of the permanent magnetic flux may cause the disengagement of second nut 46 from first screw 26 and consequently cause fuse element 30 to establish at least partial disengagement of second screw 28 from first screw 26. Coil 66 may comprise an induction coil wrapped around part of one of flux conducting members 60. Coil 66 may be configured to receive an electrical (e.g., direct) current and thereby produce an induced magnetic flux that causes at least some of the permanent magnetic flux passing in loop L1 to be redirected through gap 64 in loop L2. The induced magnetic flux may interact with the permanent magnetic flux to cause the redirection of the permanent magnetic flux. For example, the induced magnetic flux may be of opposite polarity to that of the permanent magnetic flux and may superimpose the permanent magnetic flux in loop L1 and accordingly counteract the permanent magnetic flux in loop L1. Accordingly, the induced magnetic flux may therefore increase the resistance to the permanent magnetic flux passing through loop L1 and cause redirection of at least some of the permanent magnetic flux to loop L2. Engagement of second nut 46 with first screw 26 may be established via the permanent magnetic flux when no power is provided to fuse element 30 and the disengagement of second nut 46 from first screw 26 may be established when an electrical current is supplied to coil 66 of fuse element 30 to produce the induced magnetic flux. The disengagement of second nut 46 from first screw 26 via fuse element 30 may at least partially remove the load path between flight control surface 14 and structure 18 provided by actuator 20.

The use of a flux redirecting mechanism instead of a flux cancelling mechanism may avoid demagnetization of permanent magnet 62. Accordingly, the engagement and disengagement of second screw 28 from first screw 26 via fuse element 30 may be carried out more than once without significant demagnetization of permanent magnet 62 and may be carried out repeatedly during testing for example.

Variable adjustment of the intensity of the induced magnetic flux via coil 66 may cause variable adjustment of the yield shear strength of MR fluid 52 and consequently cause variable adjustment of the power transfer between power transfer members 54 and 56. For example, by controlling the intensity of the induced magnetic flux, the yield shear strength of MR fluid 52 may be varied between a minimum value where second nut 46 can rotate substantially freely relative to first screw 26 and a maximum value where second nut 46 and first screw 26 are engaged (e.g., locked, stuck together). Accordingly, the adjustment of the intensity of the induced magnetic flux may be used to modulate the yield shear strength of MR fluid 52 to control the slippage between second nut 46 and first screw 26 and thereby control the amount of power transmitted between second nut 46 and first screw 26. Controlling the intensity of the induced magnetic flux may also be used to actively control and predict the amount of (e.g., flutter) damping provided by actuator 20.

Figure 5:
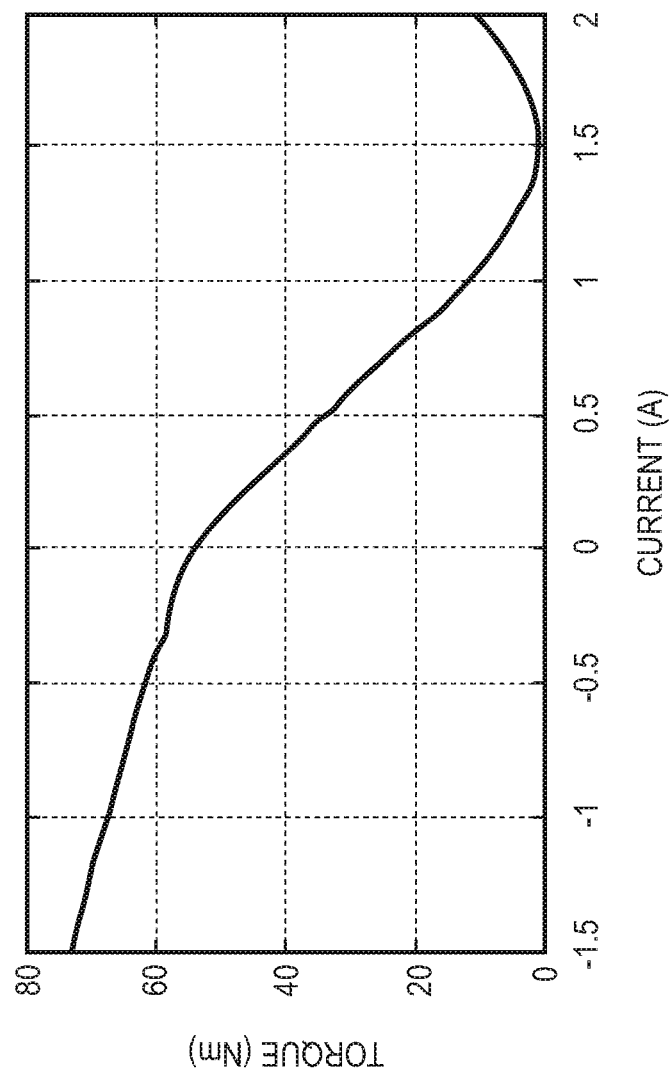
FIG. 5 is a plot showing an exemplary correlation between current sent to the fuse element of the actuator of FIG. 3 and the resistive torque provided by the fuse element.

FIG. 5 is a plot showing an exemplary correlation between current (Amperes) sent to coil 66 and the resistive torque (Nm) of fuse element 30. For up to a current of about 1.5 A, the amount of torque transmitted via fuse element 30 decreases as current passing through coil 66 increases. At 0 A where no magnetic flux is generated using coil 66, fuse element 30 may have a resistive torque selected to be sufficient to actuate flight control surface 14 using actuator 20 and also maintain flight control surface 14 in position during normal operation of aircraft 10. At 1.5 A, the resistive torque of fuse element 30 may be significantly reduced and may, in some embodiments, be substantially eliminated. If a current is sent through coil 66 in the opposite direction (i.e., negative current), the induced magnetic flux may be added to the permanent magnetic flux and thereby cause an increase in the resistive torque provided by fuse element 30.

Figure 6A:
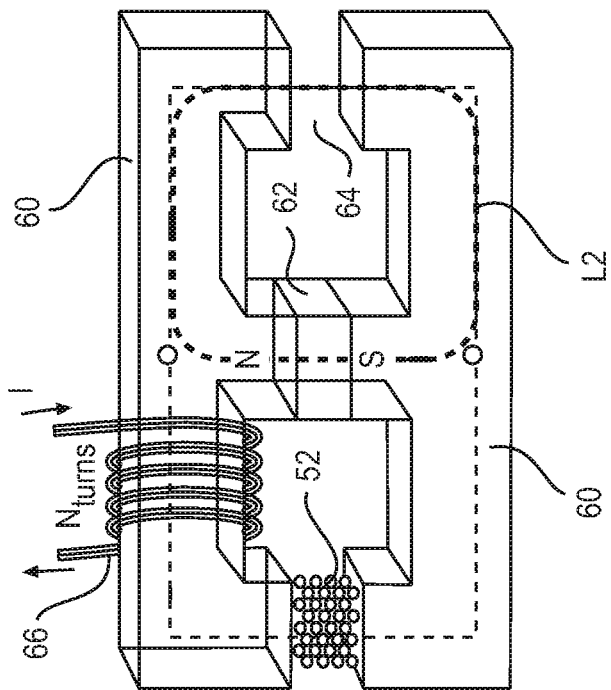
FIGS. 6A and 6B are schematic illustrations showing a principle of redirecting at least a portion of magnetic flux in the fuse element of FIG. 4B.
Figure 6B:
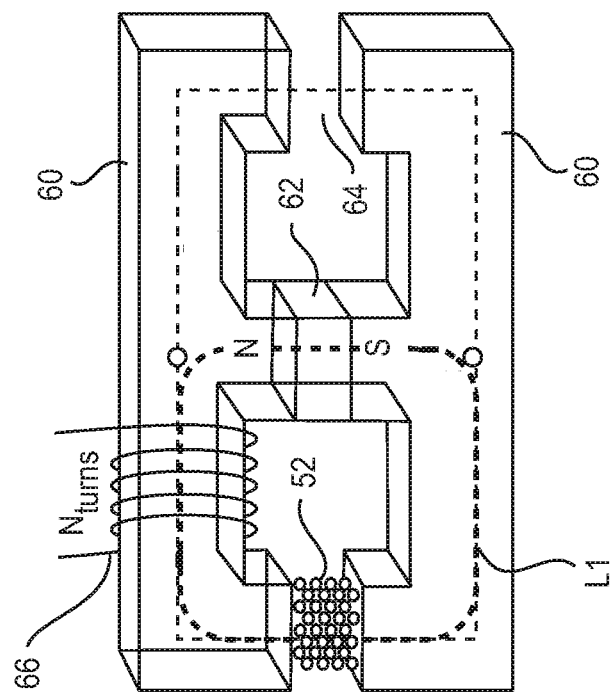

FIGS. 6A and 6B are schematic illustrations of an exemplary principle of redirecting at least a portion of the permanent magnetic flux from MR fluid 52 in loop L1 to gap 64 in L2 as described above. In light of the present disclosure, it should be understood that other means of removing a magnetic flux from MR fluid 52 may be used to disengage fuse element 30. Specifically, FIG. 6A shows permanent magnetic flux from permanent magnet 62 being directed to MR fluid 52 via loop L1. In this configuration, no current is sent to coil 66. FIG. 6B shows at least some of the permanent flux being redirected toward gap 64 via loop L2. In this configuration, electrical current is passed through coil 66 in order to produce the induced magnetic field that causes the redirection of at least some of the permanent magnetic flux. More details on this method of redirecting magnetic flux can be found in the following thesis incorporated herein by reference in its entirety: M. T. Avraam, "MR-fluid brake design and its application to a portable muscular rehabilitation device", Université Libre de Bruxelles, France, 2009.

Figure 7:
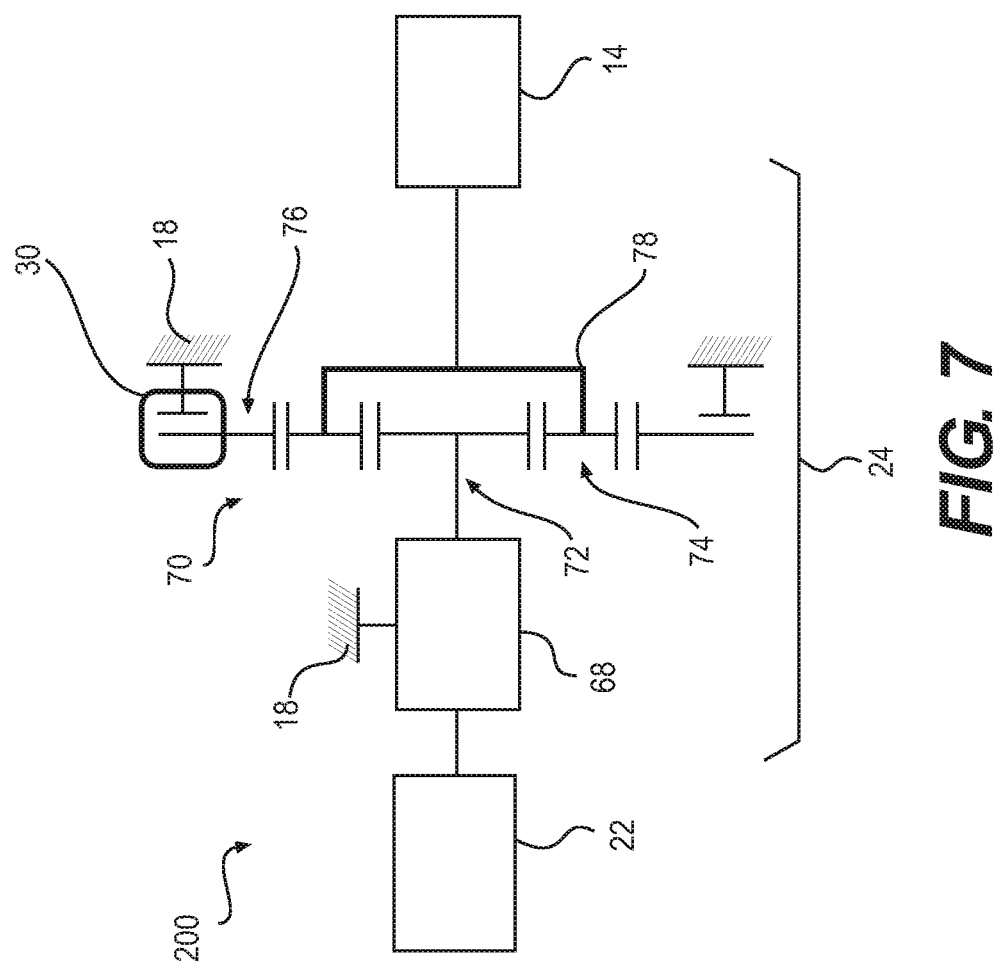
FIG. 7 is a schematic representation of another exemplary actuator for the flight control assembly of FIG. 2.

FIG. 7 is a schematic representation of another exemplary actuator 200 that may be part flight control assembly 16 of FIG. 2. One or more of actuator 200 may be used instead of or in addition to one or more of actuators 20A and 20B of FIG. 2. While actuator 20 may be configured to output linear movement, actuator 200 may be configured to output rotary movement. Accordingly, actuator 200 may, for example, be suitable for actuating one or more flight control surfaces 14 (e.g., flap, slat, elevator and rudder) that undergo rotation about a hinge line. In light of the present disclosure, it should be understood that various aspects of the present disclosure may be used in conjunction with actuators having different configurations than those illustrated herein. For example, various aspects of the present disclosure may be used with actuators having power transfer means other than the screws and gear mechanisms shown herein.

Actuator 200 may comprise motor 22 coupled to first gear mechanism 68. First gear mechanism 68 may be coupled to second gear mechanism 70 which may in turn be coupled to one or more flight control surfaces 14. First gear mechanism 68 may function as an actuation member in the load path between flight control surface 14 and aircraft structure 18. First gear mechanism 68 and second gear mechanism 70 may be mounted in series in the load path. First gear mechanism 68 and second gear mechanism 70 together may at least partially define the load path between aircraft structure 18 and flight control surface 14. First gear mechanism 68 may comprise a speed reducing gear set and second gear mechanism 70 may comprise a planetary (epicyclic) gear set. Accordingly, second gear mechanism 70 may comprise sun gear 72 coupled to an output of first gear mechanism 68. Second gear mechanism 70 may also comprise one or more planet gears 74 coupled to sun gear 72 and ring gear 76 coupled to planet gear(s) 74. The rotation of planet gears 78 about sun gear 72 may be transmitted to flight control surface 14 via planet carrier 78.

Actuator 200 may also comprise fuse element 30 selectively coupling ring gear 76 to aircraft structure 18. Fuse element 30 may effectively cause coupling between planet carrier 78 and the output of motor 22. Fuse element 30 may also permit at least partial disengagement of planet carrier 78 from first gear mechanism 68 to permit relative rotation between planet carrier 78 and sun gear 72. The disengagement achieved via fuse element 30 may cause the release of ring gear 76 from aircraft structure 18 to permit rotation of ring gear 76 and planet gears 74 in the event of a jam or other fault that would prevent rotation of sun gear 72 or otherwise prevent the use of sun gear 72 to actuate flight control surface 14. The disengagement could thereby permit flight control surface 14 to be actuated via another actuator 200 (not shown in FIG. 7). The disengagement of planet carrier 78 from sun gear 72 via fuse element 30 may cause at least partial removal of the load path provided by actuator 200 between flight control surface 14 and aircraft structure 18.

During operation, one or more of actuators 20 and 200 may be used to actuate flight control surface 14 during flight or other phases of operation of aircraft 14. The use of fuse element 30 may facilitate the use of EMAs for actuating one or more primary flight control surfaces (e.g., 140, 14E and 14F shown in FIG. 1) of aircraft 10. Some existing EMAs can have a potential risk of jamming associated with them and the use of fuse element 30 with such or other EMAs may permit a jammed actuator to be disabled while still permitting at east some control of flight control surface 14 via one or more other healthy actuators 20, 200. While the figures of the present disclosure illustrate fuse element 30 as being part of electromechanical actuators 20 and 200, fuse element 30 could also be part of or used in conjunction with a hydraulic or other type(s) of actuators.

Fuse element 30 may be used to partially remove or eliminate a load path between flight control surface 14 and structure 18. For example, the removal of such load path may be useful in situations where a fault condition has been encountered with actuator 20A (see FIG. 2) and it may be desirable to continue controlling flight control surface 14 with another actuator such as actuator 20B. The fault condition may include a mechanical jam in the load path upstream of fuse element 30, For example, the fault condition may comprise a situation where first screw 26 may be jammed due to failure of one or more of first screw 26, first nut 32, gear 34, gear 36 and motor 22. During such or other fault condition(s) where the performance of actuator 20A may be degraded to an unacceptable level, the disengagement of fuse element 30 may permit second screw 28 to be translated without significant resistance or inertia relative to first screw 26 and therefore still permit the actuation of flight control surface 14 using actuator 20B even though actuator 20A may have been disabled.

Figure 8:
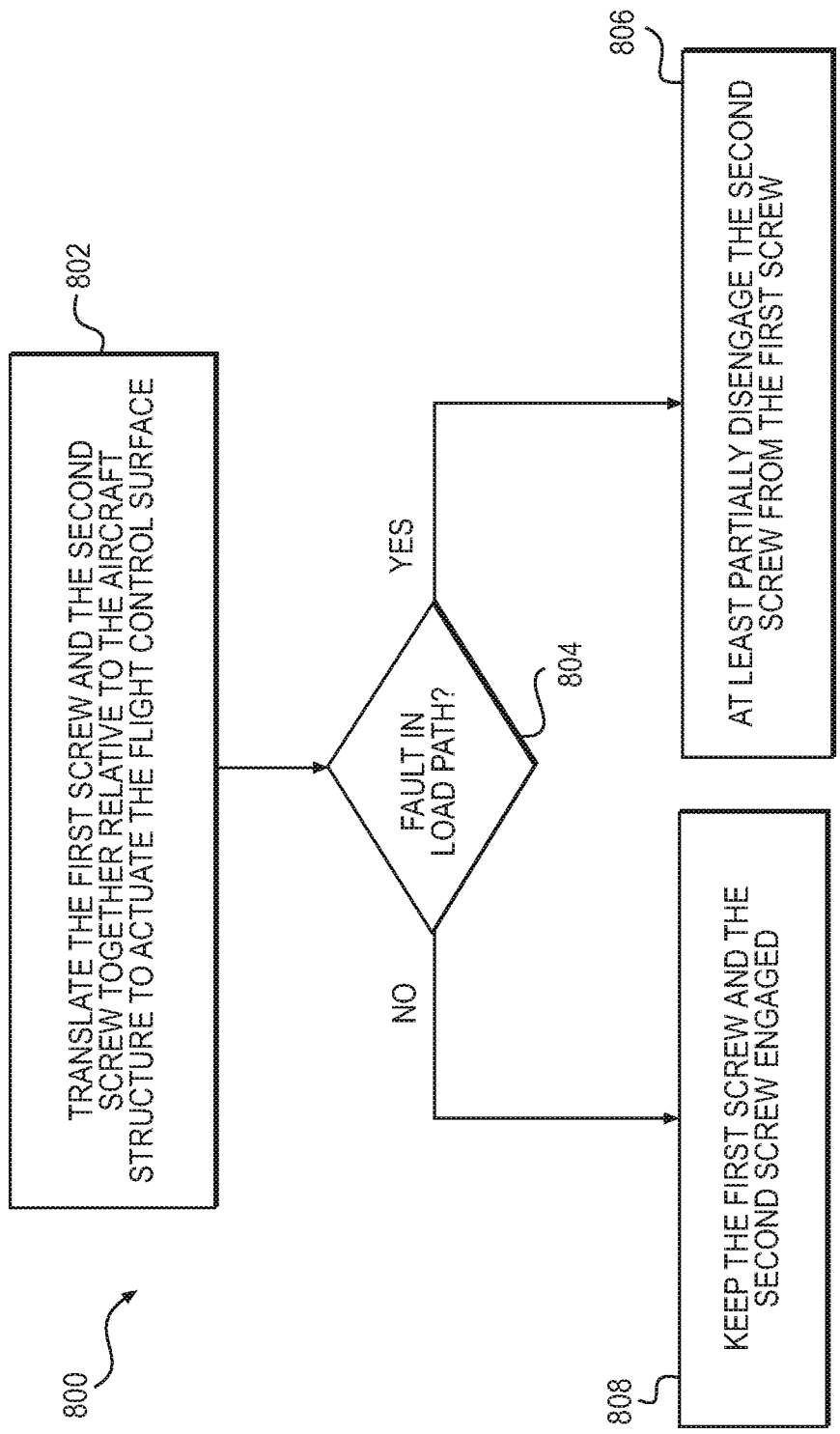
FIG. 8 is a flowchart of an exemplary method of operating a flight control surface.

FIG. 8 is a flowchart of an exemplary method 800 of operating flight control surface 14 of aircraft 10 using first screw 26 mounted in series with second screw 28 defining a load path between flight control surface 14 and structure 18 of aircraft 10 (see FIG. 3 also). In various embodiments, method 800 may comprise: translating first screw 26 and second screw 28 together relative to aircraft structure 18 to actuate flight control surface 14 (see block 802); and conditioned upon a fault condition associated with the load path being detected (see block 804), at least partially disengaging second screw 28 from first screw 26 (see block 806) to permit relative translation movement between first screw 26 and second screw 28 and to at least partially remove the load path provided by first screw 26 and second screw 28, The partial disengagement of second screw 28 from first screw 26 may be achieved via fuse element 30. Alternatively, if no fault condition is detected with the load path at block 804, first screw 26 and second screw 28 may be kept engaged to each other (see block 808) so as to operate flight control surface 14 normally.

In some embodiments, the detection of a fault such as a jam condition may be achieved by monitoring the electrical current being delivered to motor 22. For example, when the current demand of motor 22 exceeds a predefined threshold, actuator 20 may be considered jammed.

As described above, the fault condition detected at block 804 comprises an at least partial jam associated with first actuator 20A comprising first screw 26 and second screw 28 and second actuator 20B (see FIG. 2 also) may be used for actuating flight control surface 14 in the event of the fault condition. Relative translation movement between first screw 26 and second screw 28 may comprise telescopic movement of second screw 28 relative to first screw 26. Also, the at least partial disengagement of second screw 28 from first screw 26 may comprise reducing an amount of (e.g., permanent) magnetic flux through MR fluid 52. In some embodiments, the at least partial disengagement of second screw 28 from first screw 26 may, for example, comprise redirecting the magnetic flux away from MR fluid 52.

Figure 9:
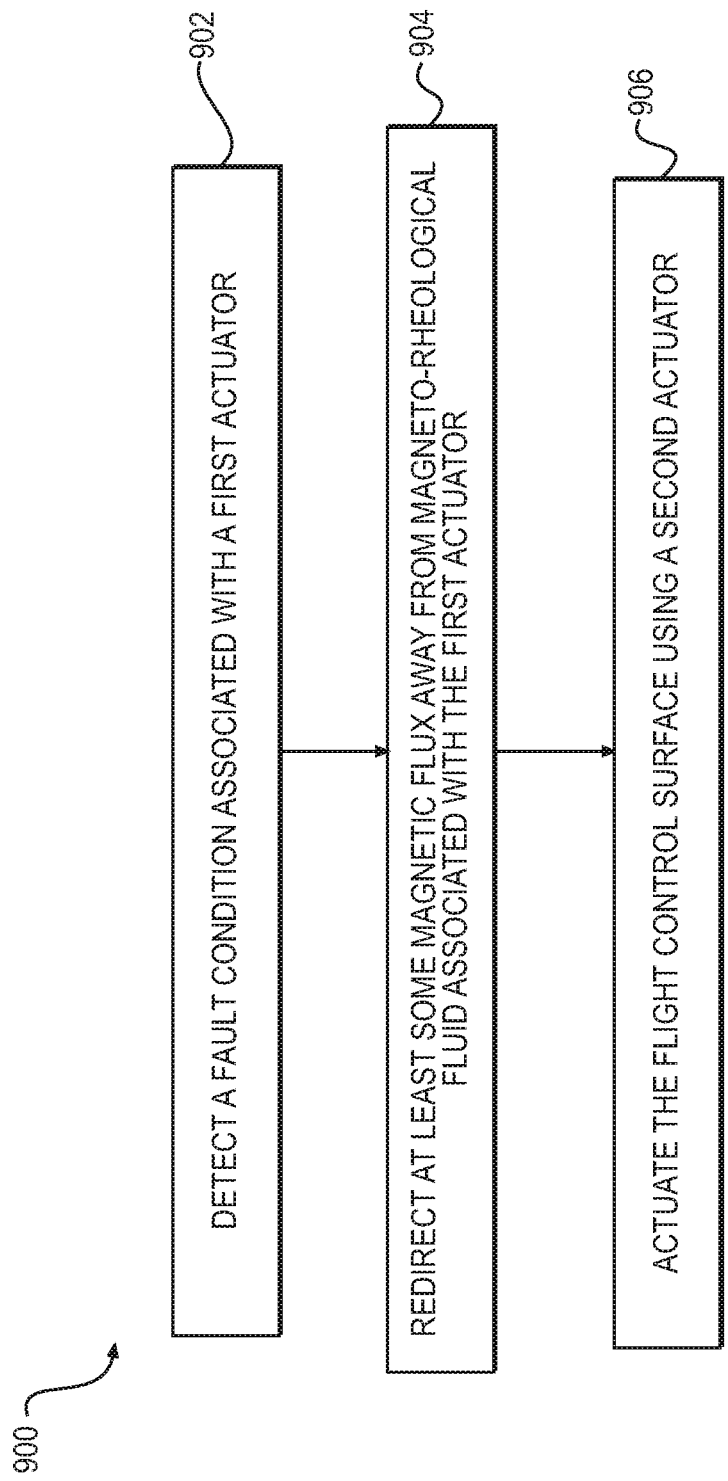
FIG. 9 is a flowchart of another exemplary method of operating a flight control surface.

FIG. 9 is a flowchart of an exemplary method 900 for operating flight control surface 14 of aircraft 10 where first actuator 20A and second actuator 20B (see FIG. 2 also) are coupled to flight control surface 14 and first actuator 20A may comprise fuse element 30 with MR fluid 52 and permanent magnet 62 (see FIG. 4B also) producing a first magnetic flux through the MR fluid 52. Method 900 may similarly be used for operating flight control surface 14 using two or more of actuators 200. In various embodiments, method 900 may comprise: detecting a fault condition associated with first actuator 20A, 200 (see block 902 in FIG. 9); redirecting at least some of the first magnetic flux away from MR fluid 52 of fuse element 30 to at least partially remove a first load path to flight control surface 14 provided by first actuator 20A, 200 (see block 904); and actuating flight control surface 14 using second actuator 20B, 200 (see block 906).

As explained above, the fault condition may comprise an at least partial jam associated with first actuator 20A, 200. Also, the redirecting of at least some of the first magnetic flux away from MR fluid 52 may comprise producing a second (e.g., induced) magnetic flux that influences the first (e.g., permanent) magnetic flux.

Figure 10:
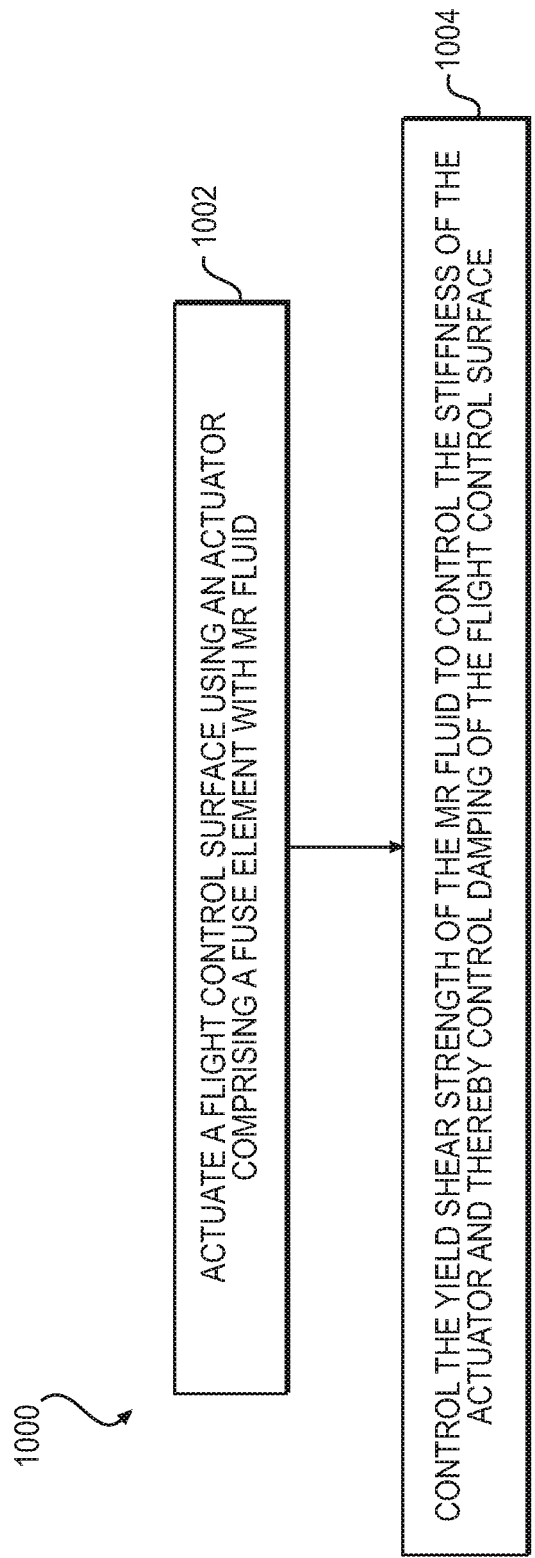
FIG. 10 is a flowchart of another exemplary method of operating a flight control surface.

FIG. 10 is a flowchart of an exemplary method 1000 for operating flight control surface 14 of aircraft 10 using one or more of actuators 20, 200 comprising fuse element 30 with MR fluid 52 and permanent magnet 62 (see FIG. 4B also) producing a first magnetic flux through MR fluid 52. In various embodiments, method 1000 may comprise: actuating flight control surface 14 using actuator 20, 200 (see block 1002); and controlling the yield shear strength of MR fluid 52 to control the stiffness of actuator 20, 200 and thereby control damping of flight control surface 14.

The controlling of the yield shear strength of MR fluid 52 may comprise redirecting at least some of the first magnetic flux away from MR fluid 52 of fuse element 30. The redirecting of at least some of the first magnetic flux away from MR fluid 52 may comprise producing a second magnetic flux that influences the first magnetic flux as described above.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, actuators, assemblies, components and methods disclosed and shown herein may comprise a specific number of elements/components, the systems, actuators, assemblies, components and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. An electromechanical actuator for actuating a flight control surface of an aircraft, the actuator comprising:
    a motor;
    a first screw configured for translation movement relative to a structure of the aircraft when driven by the motor;
    a second screw mounted in series with the first screw, the first screw and the second screw defining a load path between the aircraft structure and the flight control surface;
    a fuse element coupling the first screw and the second screw together to permit translation movement of the second screw together with the first screw, the fuse element permitting at least partial disengagement of the second screw from the first screw to permit translation of the second screw relative to the first screw.

2. The actuator as defined in claim 1, wherein the second screw is at least partially received inside the first screw.

3. The actuator as defined in claim 1, wherein the first screw and the second screw are configured to permit telescopic movement of the second screw relative to the first screw when the fuse element at least partially disengages the second screw from the first screw.

4. The actuator as defined in claim 1, wherein the fuse element comprises magneto-rheological fluid.

5. The actuator as defined in claim 4, wherein the fuse element comprises a permanent magnet for directing a first magnetic flux through the magneto-rheological fluid.

6. The actuator as defined in claim 5, wherein the fuse element comprises a coil for receiving a current therethrough for producing a second magnetic flux that redirects at least part of the first magnetic flux away from the magneto-rheological fluid.

7. The actuator as defined in claim 1, wherein the fuse element functions as a power-off brake.

8. The actuator as defined in claim 1, wherein the first screw is coupled to the motor via a first nut.

9. The actuator as defined in claim 8, wherein the first nut is rotatably supported by the aircraft structure.

10. The actuator as defined in claim 1, wherein the second screw is coupled to the first screw via a second nut.

11. The actuator as defined in claim 10, wherein the second nut is rotatably supported by the first screw.

12. The actuator as defined in claim 1, wherein the first screw is coupled to the motor via a gear.

13. The actuator as defined in claim 1, wherein the first screw is mounted to substantially prevent rotation of the first screw relative to the aircraft structure.

14. The actuator as defined in claim 1, wherein the second screw is mounted to substantially prevent rotation of the second screw relative to the first screw.

15. An aircraft comprising the actuator as defined in claim 1.

16. An assembly for actuating a flight control surface of an aircraft, the assembly comprising:
    an actuation member configured to be in a load path between the flight control surface and a structure of the aircraft for actuating the flight control surface relative to the aircraft structure; and
    a fuse element configured to be in the load path with the actuation member, the fuse element comprising magneto-rheological fluid and a permanent magnet for directing a first magnetic flux through the magneto-rheological fluid.

17. The assembly as defined in claim 16, wherein the actuation member comprises a screw.

18. The assembly as defined in claim 16, wherein the actuation member comprises a gear mechanism.

19. The assembly as defined in claim 16, comprising an electric motor for driving the actuation member.

20. The assembly as defined in claim 16, wherein the fuse element comprises a coil for receiving a current therethrough for producing a second magnetic flux that redirects at least part of the first magnetic flux away from the magneto-rheological fluid.

21. The assembly as defined in claim 16, wherein the fuse element functions as a power-off brake.

* * * * *